Patented Oct. 6, 1953

2,654,786

UNITED STATES PATENT OFFICE 2,654,786

POLYETHYLENE GLYCOLS FROM ETHER-ESTERS OF GLYCOLIC ACID

William F. Gresham, Wilmington, Del., assignor to E. I. du Pont de Nemours and Company, Wilmington, Del., a corporation of Delaware No Drawing. Application December 8, 1949, Serial No. 131,939

5 Claims. (Cl. 260—615)

This invention relates to a process for the preparation of glycols by the hydrogenation of ether-esters of hydroxyacetic acid and is more particularly related to the preparation of diethylene glycol and triethylene glycol by a two-step process, in the first step of which hydroxyacetic acid is esterified and etherified to a complex ether-ester and in the second step of which the ether-ester of the first step is hydrogenated.

The course of the reaction is illustrated by these simplified equations:

(1) 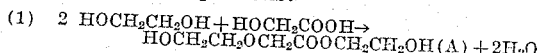

(2) 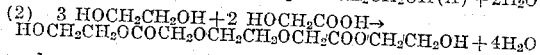
and (3) 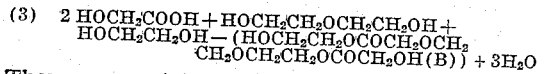

They represent the esterification and etherification of hydroxyacetic acid with ethylene glycol or diethylene glycol. The actual reaction gives complex glycol ether-esters of hydroxyacetic acid.

The complex ether-ester (A) of Equation 1 on hydrogenation is converted to ethylene glycol and diethylene glycol while the complex ether-ester (B) of Equation 3, on hydrogenation, is converted principally to triethylene glycol and ethylene glycol. Other more complex ether-esters are formed during the esterification and etherification reaction and as a consequence other glycols are produced during the hydrogenation of the complex mixture of ether-esters.

The equations show, inter alia, the overall preparation of ethylene glycol, diethylene glycol and triethylene glycol from hydroxyacetic acid and ethylene glycol. Ethylene glycol and diethylene glycol, products of the hydrogenation, will recombine with hydroxyacetic acid, these reactants may be returned in a cyclic process with the result that the basic materials for the reaction constitute essentially hydroxyacetic acid and hydrogen.

An object of the present invention is to provide a process for the preparation of diethylene glycol and triethylene glycol. Another object of the invention is to provide a process for the etherification of a glycol ester of hydroxyacetic acid. Yet another object is to provide a process for the simultaneous production of diethylene glycol and triethylene glycol from the hydrogenation of a complex ether-ester produced by the etherification of a glycol ester of hydroxyacetic acid. Yet another object is to provide a continuous process for the preparation of diethylene glycol and triethylene glycol. Other objects and advantages of the invention will hereinafter appear.

In accord with the preferred embodiment of the invention, the esterification and etherification of hydroxyacetic acid are conducted in step one to produce complex ether-esters which, in step two, are hydrogenated to give ethylene glycol, diethylene glycol, triethylene glycol and higher glycols. The reactions in step one are necessarily complex because of the many possible reactions that may occur between hydroxyacetic acid, and the glycols introduced. In the hydrogenation step, the complex ether-ester is hydrogenated to a mixture of ethylene and polyethylene glycols. The ethylene glycol and diethylene glycol can be returned to the reaction and only the desired polyethylene glycol separated, by this means it is possible to conduct the reaction for the production of a single polyethylene glycol.

One manner of conducting the consolidated esterification and etherification step of the process is by mixing hydroxyacetic acid with ethylene glycol and/or recycled diethylene or other polyethylene glycols. This esterification-etherification reaction is conducted in the presence of a mild catalyst under conditions such that the production of dioxane and other undesired by-products are restricted. The hydrogenation step is carried out in accord with one modification of the reaction by continuously hydrogenating a mixture of the complex ether-ester intermediate of the first step to the polyethylene glycols. The products of the hydrogenation step are distilled at reduced pressure, whereby triethylene glycol is separated from the ethylene glycol and other glycols which may be recycled. The process may be conducted continuously or by batch methods although the former is more economical for commercial production.

The more detailed practice of the invention is illustrated by the following examples in which parts are by weight unless otherwise stated.

*Example 1.*—A mixture of ethylene glycol and hydroxyacetic acid was placed in a suitable converter provided with a reflux condenser, the reaction mixture heated to a temperature between 120 and 160° C. The starting ratio of ethylene glycol to hydroxyacetic acid may range between 1.25:1 to 7:1, Super Filtrol X358C (an acid activated bentonite clay manufactured by the Filtrol Company) is employed as the catalyst and the temperature raised to about 185° C. and held for 2 hours in order to complete the reaction. Water plus some ethylene glycol, diethylene glycol and dioxane, together with glycol glycolate, distill over during the reaction. The catalyst is then filtered from the reaction mixture and dry methanol added to the filtrate. The reaction mixture, in methanol, is then heated to a temperature of 200 to 220° C. for 30 minutes in order to transform the glycol esters or polyglycolide formed into methyl esters. The resulting mixture is adjusted to a pH of 8–9 by the addition of sodium methoxide and then hydrogenated at 700 atmospheres at a temperature of 250° C. for 1 hour in the presence of a manganese chromite catalyst. The hydrogenated product is then distilled and there is obtained triethylene glycol B. P. 116–120/1 mm., ethylene glycol and diethylene glycol. Higher boiling polyethylene glycols are likewise present.

*Example 2.*—A mixture composed of 93.0 g. of ethylene glycol, 53.0 g. of diethylene glycol and 38.0 g. of hydroxy-acetate acid (molar ratios 1.5:0.5:0.5) is heated from 120 to 160° during a period of two hours while 2 cu. ft./hr. of carbon dioxide is passed through the solution in order to facilitate removal of water of esterification. The etherification catalyst, 18.4 g. (10% of the liquid charge) of Super Filtrol X358C is added and the temperature raised to 185° for two hours in order to complete the reaction, the flow of carbon dioxide being continued. During this period 7.0 g. of ethylene glycol is added continuously in an attempt to replace the 14.0 g. of ethylene glycol carried overhead. A total of 16.2 g. of water is liberated which corresponds to 90% of the theoretical. In addition 2.6 g. of diethylene glycol, 0.5 g. of dioxane and 0.5 g. of glycol glycolate is carried over by the carbon dioxide. The catalyst is filtered from the reaction mixture and 200 g. of dry methanol added to the filtrate. Equilibration is then carried out at 200–220° for 30 minutes in order to transform glycol esters or polyglycolide into methyl esters. The equilibrated mixture is adjusted to a pH of 8–9 by the addition of 0.1–0.2 g. of sodium methoxide after which the mixture is hydrogenated at 700 atmospheres/250°/1 hr. in the presence of 20 g. of a manganese chromite catalyst. Upon distillation of the hydrogenated product, there is obtained 15.3 g. of triethylene glycol (B. P. 116–120°/1 mm.) along with foreshots of 79.1 g. of ethylene glycol and 64.0 g. of diethylene glycol. Higher boiling polyethylene glycols accounted for 1.1 g.

The table which follows illustrates a series of reactions conducted continuously in which diethylene glycol, triethylene glycol and higher polyglycols were produced.

*Table I*

| Expt. No. | Moles of ethylene glycol | Moles of diethylene glycol | Moles of hydroxy-acetic acid | Catalyst | Temperature, °C. | Time (hrs.), gas=(+) | Percent theoretical of H₂O removed | Grams of dioxane | Grams of glycol carried overhead | Grams of glycol added during reaction | Total grams of ethylene glycol recovered | Grams of diethylene glycol | Grams of triethylene glycol | Grams of higher ethylene glycols | Wt. ratios Di:Tri:Higher |
|---|---|---|---|---|---|---|---|---|---|---|---|---|---|---|---|
| 1 | 4 | | 1 | S. F. (3%) | 180–185 | 12 | 116 | 11.5 | | | 85.0 | 65.7 | 29.3 | 11.6 | 22:1:0.4 |
| 2 | 2 | 1 | 1 | do | 175–190 | 4(+) | 96 | 28.3 | | | 80.0 | 81.0 | 45.7 | 14.6 | 1.8:1:0.3 |
| 3 | | .375 | 2 | do | 170–185 | 7 | 62 | 3.6 | | | 26.4 | 150.0 | 10.6 | | 4:1 |
| 4 | 1.5 | | 1.25 | S. F. (2%) | 185 | 9(+) | 90 | 9.2 | 15.0 | 19.6 | 78.4 | 33.7 | 31.6 | 20.1 | 1.07:1:0.6 |
| 5 | 1.1 | .4 | 1 | do | 185 | 9(+) | 81 | 8.1 | 19.4 | 18.5 | 75.5 | 34.2 | 24.4 | 11.6 | 1.4:1:0.5 |
| 6 | 1.6 | .4 | 1 | S. F. (10%) | {120–160 / 185} | 2(+) / 7½(+) | 110 | 3.4 | 5.8 | 15.3 | 59.4 | 35.0 | 40.4 | 38.5 | 0.9:1:0.9 |
| 7 | 1.87 | .63 | 1 | do | {120–160 / 185} | 2(+) / 5(+) | 90 | 6.7 | 23.2 | 11.0 | 107.8 | 62.6 | 32.3 | 10.5 | 1.9:1:0.3 |
| 8 | 1.4 | .6 | 1 | do | {120–160 / 153–165} | 2(+) / 15(+) | 95.6 | 12.4 | 29.9 | 17.8 | 83.7 | 37.5 | 31.2 | 22.3 | 1.2:1:0.7 |
| 9 | 2 | .5 | 1 | do | {150–160 / 185} | 2(+) / 4(+) | 95.0 | 11.5 | 19.1 | 6.7 | 92.2 | 58.8 | 35.8 | 16.0 | 1.6:1:0.4 |
| 10 | 1.6 | .4 | 1 | do | {120–160 / 160–193} | 2(+) / 2(+) | 91.0 | 6.1 | 16.0 | 4.5 | 84.5 | 42.9 | 30.4 | 12.1 | 1.4:1:0.4 |
| 11 | 2.25 | .75 | 1 | do | {120–160 / 185} | 2(+) / 3(+) | 99.0 | 6.8 | 21.7 | 20.0 | 128.7 | 96.2 | 39.4 | 10.0 | 2.4:1:0.25 |
| 12 | 2.33 | .67 | 1 | do | {120–160 / 185} | 2(+) / 2(+) | 92.8 | 14.3 | 33.6 | 20.0 | 130.4 | 76.7 | 38.3 | 15.6 | 2.1:1:0.4 |
| 13 | 1.4 | .6 | 1 | Zeo Karb-H (5%) | {120–160 / 185} | 2(+) / ½(+) | 101 | 9.7 | 8.0 | 7.8 | 80.0 | 42.5 | 27.2 | 23.2 | 1.6:1:0.8 |
| 14 | 2.25 | .75 | 1 | S. F. (10%) | {120–160 / 185} | 2(+) / 3(+) | 92.2 | 6.4 | 30.2 | 31.2 | 130.6 | 77.3 | 38.7 | 16.8 | 2:1:0.43 |

S. F.=an acidified clay.
Zeo Karb-H=an acidified clay.

While the process herein described has been conducted with a simultaneous esterification and etherification of hydroxy-acetic acid, the process may likewise be conducted if desired by first esterifying the hydroxyacetic acid and thereafter etherifying it. The esterification reaction, when conducted in this manner, may be carried out at a temperature between 120 and 160° C. for about 2 hours in the presence, or absence, of a mild esterification catalyst. The etherification reaction is then conducted at a temperature of 160–195° C. for 1 to 6 hours.

For conducting the simultaneous esterification and etherification reaction a weakly acidic catalyst is preferred such as Super Filtrol X358C, boron fluoride, and acidified clays generally. These catalysts, and similar catalysts, may be employed in concentrations of 2 to about 10% of the liquid charge. With these, and similar catalysts, it is advisable to remove the water of esterification during the dual reaction and to accomplish this carbon dioxide or other inert gas such as nitrogen may be passed through the reaction. The reaction with these catalysts, and with the introduction of carbon dioxide or other inert gas is accomplished in from 2 to 15 hours at a temperature between 150 and 195° C. Very little, if any, degradation of the hydroxyacetic acid, or the glycols, results from operation in this manner.

The hydrogenation reaction may be conducted at a temperature between 150 and 300° C. with any suitable type of hydrogenation catalyst such as a nickel, copper, chromium, metal chromite catalysts or mixtures thereof. These reactions are preferably conducted under pressures ranging between 30 and 1000 atmospheres. Prior to hydrogenation it is recommended that substantially all of the water of etherification and esterification be removed for if there is considerable water present the complex ether-esters will hydrogenate only with difficulty.

The water may be removed either by vacuum distillation after esterification and etherification or by passing a stream of carbon dioxide, nitrogen or other inert gas, with or without the aid of a gas dispersing type stirrer, into the reaction mixture concurrently with esterification and etherification to remove the water as formed. The latter procedure is more advantageous because the progress of the reaction is under better control and the time of the reaction reduced.

For batchwise operation the mole ratio of hydroxyacetic acid to ethylene glycol to diethylene glycol may range between 1:7:0 to 1:0:1 to 1.25:0:7. When operated continuously or batchwise for the preparation of triethylene glycol, it has been found desirable to return the diethylene glycol and ethylene glycol formed during hydrogenation to the first step.

With carbon dioxide, or other inert gas, any suitable gas flow may be used. With a flow of about 2 cu. ft. per hour per 0.01 cu. ft. of reactant mixture, esterification of hydroxyacetic acid, at a temperature between 120 and 170° C., required about 2 hours in the absence of an added catalyst. Using Super Filtrol as the catalyst, etherification occurred readily in one to six hours at temperatures between 175 and 195° C., 185° C. being the optimum temperature for the reaction. At temperatures below 165° C. the etherification reaction is quite sluggish and at 195° C. quite rapid. Variations in reaction temperature appear to have no appreciable effect on the final product distribution.

As a prerequisite for optimum hydrogenation these conditions should be observed:

(1) All but traces of water should be removed from the ether-ester mixture.

(2) Conversion of the ether-ester mixture by the addition of methanol at a temperature of 200–220° for 30 minutes is recommended to transform polyglycolides and glycol esters present at least in part to methyl esters. This procedure reduces the viscosity of the mixture. The resulting mixture may then be more easily hydrogenated at a temperature between 125 and 300° C. at pressures ranging between 300 and 1000 atmospheres.

The effect of varying the ratio of total glycols to hydroxyacetic acid has a decided result on the distribution of products. The ratio of ethylene glycol to hydroxyacetic acid may be varied from 7:1 to 1.25:1. As the ratio of glycol to acid is lowered, the quantity of tri and higher polyethylene glycols increases while the quantity of diethylene glycol decreases. The effect of recycling increasing amounts of diethylene glycol increases the quantity of triethylene glycol and higher polyethylene glycols finally produced. Higher ratios of glycols to acid can be used when diethylene glycol is recycled, as compared with the use of ethylene glycol alone.

I claim:

1. A process for the preparation of polyethylene glycols which comprises esterifying and etherifying hydroxyacetic acid with a glycol at a temperature between 100 and 225° C. in the presence of a weakly acidic catalyst and thereafter hydrogenating the resulting complex ether-ester of hydroxyacetic acid to polyethylene glycols.

2. A process for the preparation of polyethylene glycols which comprises esterifying and etherifying hydroxyacetic acid with a glycol at a temperature between 100 and 225° C. in the presence of a weakly acidic and etherification catalyst and thereafter hydrogenating the resulting complex ether-ester of hydroxyacetic acid to polyethylene glycols.

3. A process for the preparation of polyethylene glycols which comprises esterifying and etherifying hydroxyacetic acid with a glycol at a temperature between 100 and 225° C. in the presence of an acid activated clay as the esterification and etherification catalyst and thereafter hydrogenating the resulting complex ether-ester of hydroxyacetic acid to polyethylene glycols.

4. A process for the preparation of triethylene glycol which comprises esterifying and etherifying hydroxyacetic acid with ethylene glycols, in the presence of a weakly acidic catalyst, to complex ether-esters of the acid, hydrogenating the complex ether-ester to triethylene glycol and other polyethylene glycols, separating the triethylene glycol from the other ethylene glycols and returning the latter to the esterification and etherification reaction.

5. A process for the preparation of triethylene glycol which comprises esterifying and etherifying hydroxyacetic acid with ethylene glycol in the presence of an acid activated clay to complex glycol ethers and glycol esters of hydroxyacetic acid, thereafter hydrogenating said complex to polyethylene glycols and recovering therefrom triethylene glycol.

WILLIAM F. GRESHAM.

References Cited in the file of this patent

UNITED STATES PATENTS

| Number | Name | Date |
|---|---|---|
| 2,119,674 | Grun | June 7, 1938 |
| 2,158,107 | Carruthers et al. | May 16, 1939 |
| 2,231,729 | Meyer | Feb. 11, 1941 |
| 2,288,181 | Burgdorf et al. | June 30, 1942 |
| 2,571,212 | Croxall et al. | Oct. 16, 1951 |

FOREIGN PATENTS

| Number | Country | Date |
|---|---|---|
| 555,240 | Great Britain | Aug. 12, 1943 |
| 575,380 | Great Britain | Feb. 15, 1946 |